INVENTOR
John H. Mennie

United States Patent Office 3,360,720
Patented Dec. 26, 1967

3,360,720
ADMITTANCE MEASURING BRIDGE CIRCUIT HAVING A PAIR OF GANGED CAPACITORS
John H. Mennie, Livingston, N.J., assignor to Boonton Electronics Corporation, Morris Plains, N.J., a corporation of New Jersey
Filed June 20, 1962, Ser. No. 203,991
5 Claims. (Cl. 324—57)

The present invention relates to electrical admittance measuring apparatus and more particularly to an A-C energized circuit which utilizes one or more variable capacitors as adjustable balancing elements for measuring a wide range of electrical admittance or impedance values over an extremely wide range of frequencies.

The admittance measuring circuit provided by the present invention is particularly well suited for measuring the high-frequency electrical characteristics of various components such as semi-conductor devices (e.g., diodes, transistors, voltage variable capacitors) that are used in parametric amplifiers, microwave oscillators, modulators, harmonic generators and the like. Test instruments that have previously been proposed for making evaluation measurements on such devices generally have either lacked the required sensitivity for accurate measurements at low signal levels or have lacked the necessary measuring accuracy that is required over a wide range of test frequencies.

It is a principal object of the present invention to provide a relatively simple measuring circuit which is capable of accurately measuring a wide range of conductance values (including values approaching zero) in terms of the calibrated setting of a variable capacitor.

It is a further object of this invention to provide a sensitive admittance measuring circuit, the measuring accuracy and calibration of which is substantially independent of test frequency.

In accordance with the invention a balanced RC null sensing circuit is provided, each half of which includes a resistor and a capacitor connected in series and returned to a common reference through a high-impedance null detector. The respective circuits are energized in push-pull by A-C voltage sources having low internal impedances.

In the prefered embodiment, the resistors are selected fixed values and at least one of the capacitors is made variable to function as a null balancing element. In a balanced condition with equal values of capacitance and resistance in the respective half circuits, the null detector reads zero. The unknown conductance of a test component is measured by bridging that component between the common reference point and the junction of the resistor and the capacitor forming the half circuit opposite that including the calibrated measuring capacitor. Bridge balance is restored by simply readjusting the calibrated measuring capacitor as will be explained in greater detail below. The conductance of a test component is thus measured in terms of capacitance. By utilizing a high quality variable air capacitor as the calibrated measuring element, a simple null-sensing network is provided wherein the measuring accuracy and calibration is substantially independent of test frequency.

Various additional measuring features and advantages of the invention will be apparent from the following more particular description of preferred embodiments of the invention, as illustrated in the accompanying drawings in which.

Figure 1:
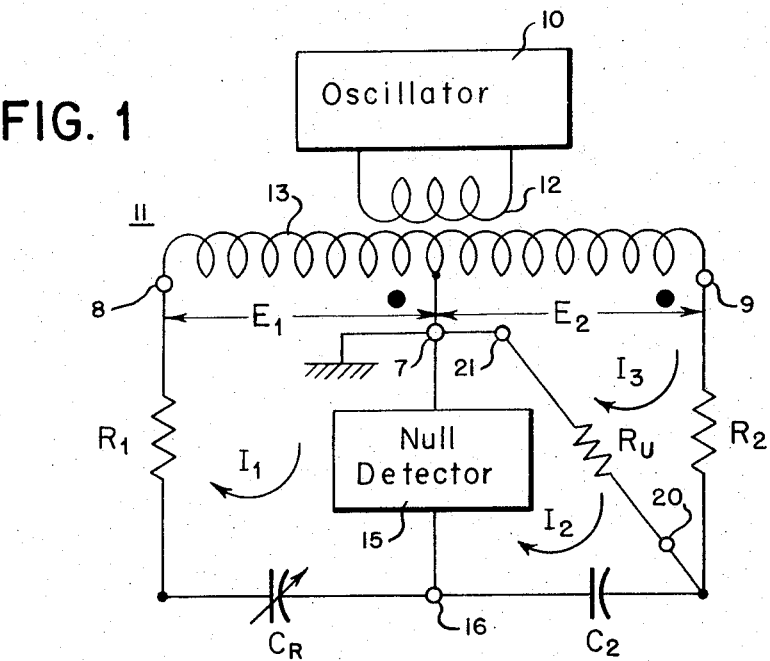
FIG. 1 is a schematic diagram of a conductance measuring circuit in accordance with the invention.

Referring to FIG. 1, excitation voltage for the admittance measuring circuit is provided by oscillator 10, the output frequency of which is preferably made adjustably variable over a desired range of test frequencies (e.g., 1 to 50 mc.). A-C voltage from the oscillator is coupled to the admittance measuring circuit by transformer 11 comprising primary winding 12 and secondary winding 13, the center-tap of which is returned to a common reference terminal 7 (chassis ground) as shown. The outer terminals of the secondary windings are connected to input terminals 8 and 9, the windings being poled (as indicated) so that the A-C voltages applied to $R_1$ and $R_2$ are 180° out of phase.

The source of impedance of transformer 11 is preferably low so that the respective halves of the circuit are effectively energized by constant voltage generators. Additionally, the transformer secondary voltages should be accurately balanced over the entire range of test frequencies. Accordingly, the shunt capacitance and leakage inductance for the separate windings should be low and balanced with respect to one another. To this end the secondary windings are advantageously tightly coupled to afford optimum operational balance.

As illustrated in FIG. 1, the measuring circuit comprises fixed resistor $R_2$ and fixed capacitor $C_2$ connected in series between input terminal 9 and output detector terminal 16 and fixed resistor $R_1$ and variable capacitor $C_R$ connected in series between terminals 8 and 16.

A null detector 15, preferably having high input impedance, is connected between chassis ground and terminal 16. Test terminals 20 and 21 are provided for connecting a test component to the circuit. In the absence of a test component, a voltage null will be sensed at 16 by detector 15 when the opposing currents through the null detector are equal. When an unknown resistor $R_U$ is connected across the test terminals, the null balance is upset and is restored by adjusting variable capacitor $C_R$ to a new setting. The conductance or resistance value is read directly from a calibrated dial operatively associated with $C_R$.

Assuming that the A-C voltages $E_1$ and $E_2$ applied to the respective halves of the measuring circuit are equal and opposite in phase, that $R_1$ equals $R_2$ and the resistance of the null detector equals $R_D$, the respective mesh equations are readily defined as follows:

Mesh 1
$$I_1R_1 + I_1R_D + \frac{I}{J\omega C_R} - I_2R_D = E_1 \qquad (1)$$

Mesh 2
$$I_2R_D - I_1R_D + \frac{I_2}{J\omega C_2} + \frac{I_2}{J\omega C_2} + I_2R_U - I_3R_U = 0 \qquad (2)$$

Mesh 3
$$I_3R_2 + I_3R_U - I_2R_U = E_2 \qquad (3)$$

The value of the unknown resistance $R_U$ solved for by substitution, is found to equal $$R_U = \frac{R_1}{C_2/C_R - 1} \qquad (4)$$

Thus with fixed values of $R_1$, $R_2$, $C_2$, the resistance (or conductance) of $R_U$ is measured directly in terms of the value of capacitance of variable capacitor $C_R$. When $R_U$ is infinite (zero conductance), it will be seen that a null balance is achieved when $C_R = C_2$.

Figure 2:
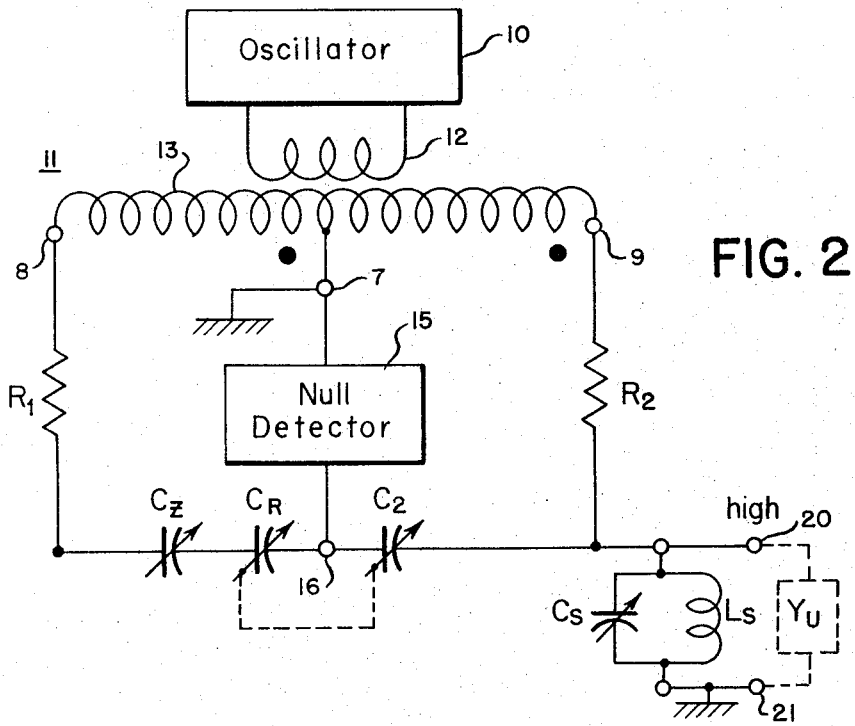
FIG. 2 is a schematic diagram of an admittance measuring circuit provided by the invention including a differential balancing capacitor and an independent zero adjust capacitor.

A preferred operational embodiment of the present invention is shown in FIG. 2 where like components are identified with the same numerals and letters as in FIG. 1.

In this embodiment of the invention, capacitor $C_2$ is also made variable and is mechanically ganged with calibrated capacitor $C_R$ to form a differential capacitor. This arrangement affords the advantage of providing greater ratio of capacitances $(C_2/C_R)$ for the first term in the denominator of Equation 4 than can be achieved by using a combination of fixed and variable capacitors.

The circuit in FIG. 2 also provides for the measurement of the inductive or capacitive reactance of the component under test as well as the resistance or conductance. To this end calibrated variable air capacitor $C_S$ and inductor $L_S$ are connected in parallel across the test terminals of the instrument as shown and $C_S$ is adjusted so that the parallel combination resonates at the desired test frequency. At resonance, the parallel tuned circuit appears as a high value resistance $R_P = Q\omega L$ where Q equals the quality factor of the tuned circuit $(X/R)$, $\omega$ equals the radian test frequency $(2\pi f)$, L equals the inductance value of $L_S$, and X equals the inductance of $L_S$.

It will be apparent that the presence of $R_P$ across the test terminals alters the null balance setting of $C_R$ obtained for an initial open circuit condition $(G_U=0)$. With the circuit of FIG. 1, balance can readily be restored by slightly reducing the capacitance of $C_R$. With the circuit in FIG. 2, rebalancing is effected by adjustment of zero adjust capacitor $C_Z$. In accordance with this featured aspect of the invention, independent zero adjust is effected without altering the initial dial setting of $C_R(G=0)$ or in any way affecting the dial calibration for $C_R$. It can readily be shown that capacitors $C_Z$, $C_R$ and $C_2$ function as a capacitor potentiometer connected in series with $R_1$ and $R_2$ and that adjustment of $C_Z$ to null out the unbalancing effect produced by residual losses in circuit components connected between test terminals 20, 21 (e.g., $G_S$) in no way affects the scale calibration of $C_R$ (or the calibration of differential capacitor $C_R$, $C_2$). Thus $C_R$ can be calibrated with only a knowledge of $C_2$, $R_1$, $R_2$ and variable capacitor $C_R$.

In actual operation, after $C_S$ has been adjusted to resonate $L_S$ and $C_Z$ has been adjusted to restore null balance, the unknown test component $Y_U$ is connected between the test terminals as shown (FIG. 2). $C_S$ is then adjusted as required to retune the parallel circuit ($C_S$, $L_S$ and $Y_U$) to resonance. Retuning is effected by adjusting $C_S$ to produce minimum output on the null detector. $C_R$ is then adjusted to give the best null. In practice the optimum null is achieved by repeating the above adjustments of $C_R$ and $C_S$ several times.

The reactance or susceptance of component $Y_U$ is then read from the calibrated scale associated with $C_S$ as the increase or decrease in capacitance required to retune $L_S$, $Y_U$ to resonance, and the resistance or conductance of the component is read from the calibrated scale associated with $C_R$ as the increase or decrease in capacitance required to restore null balance.

It will be apparent to those skilled in the art that a number of variations and modifications may be made in the described preferred embodiments of the invention illustrated in the drawing. For example, it can be shown that the positions of the resistors and capacitors in the respective halves of the circuit may be interchanged without affecting the performance of the circuit. In certain instances the user may find it desirable to replace the driver transformer with other types of broad-band low-impedance driver circuits, e.g. vacuum tube or transistor phase splitter circuits. It will be apparent also that the lumped constant circuit comprising $C_S$, $L_S$ may be replaced, where desired, by a resonant transmission line section such as a shorted variable length quarter-wave transmission line. The latter modification is particularly useful for making test measurements in the very high frequency ranges. It will also be apparent from Equation 4 that capacitor $C_2$ (FIG. 1) could be made variable and $C_R$ fixed.

While the invention has been particularly shown and described with references to a preferred embodiment thereof, it will be understood by those skilled in the art that the foregoing and other changes in form and details may be made therein without departing from the spirit and scope of the invention.

I claim:
1. Admittance measuring apparatus comprising first and second input terminals and a common chassis terminal to receive A-C voltages for energizing said apparatus, means for placing A-C voltages of opposite phase between the respective first and second input terminals and said common chassis terminal, an output detector terminal, a first resistor, a first variable capacitor and a zero-adjust variable capacitor connected in series between said first input terminal and said detector terminal, a second resistor and a second variable capacitor connected in series between said second input terminal and said detector terminal, means for mechanically coupling the rotors of said first and second variable capacitors so that with adjustment the respective capacitors change value in opposite directions, a first test terminal connected to the junction of said second capacitor and said second resistor, a second test terminal connected to said common chassis terminal, and null detector means connected between said output detector terminal and said common chassis terminal.

2. Admittance measuring apparatus comprising first and second input terminals and a common chassis terminal adapted to receive push-pull A-C voltages for energizing said apparatus, an output detector terminal, a first resistor and a first capacitor connected in series between said first input terminal and said detector terminal, said first capacitor being variable, a second resistor and a second capacitor connected in series between said second input terminal and said detector terminal, said second capacitor being variable and mechanically ganged to said first capacitor to cooperatively operate therewith as a differential capacitor, a first test terminal connected to the junction of said second capacitor and said second resistor, a second test terminal connected to said common chassis terminal, and null detector means connected between said output detector terminal and said common chassis terminal.

3. Admittance measuring apparatus comprising first and second input terminals and a common chassis terminal adapted to receive push-pull A-C voltages for energizing said apparatus, an output detector terminal, a first resistor a first variable capacitor and a zero-adjust variable capacitor connected in series between said first input terminal and said detector terminal, a second resistor and a second capacitor connected in series between said second input terminal and said detector terminal, said second capacitor being variable and mechanically ganged to said first capacitor to cooperatively operate therewith as a differential capacitor, a first test terminal connected to the junction of said second capacitor and said second resistor, a second test terminal connected to said common chassis terminal, and null detector means connected between said output detector terminal and said common chassis terminal.

4. Admittance measuring apparatus comprising first and second input terminals and a common chassis terminal adapted to receive push-pull A-C voltages for energizing said apparatus, an output detector terminal, a first resistor and a first capacitor connected in series between said first input terminal and said detector terminal, said first capacitor being variable, a second resistor and a second capacitor connected in series between said second input terminal and said detector terminal, a first test terminal connected to the junction of said second capacitor and said second resistor, a second test terminal connected to said common chassis terminal, means provided for measuring the reactance of a test element connected between the said test terminals, said means comprising an inductor and a variable capacitor connected in parallel across the test terminals, said variable capacitor being adapted to tune the inductor to resonance at the frequency of said A-C voltage, and null detector means connected between said output detector terminal and said common chassis terminal.

5. Admittance measuring apparatus comprisng first and second input terminals and a common chassis terminal adapted to receive push-pull A-C voltages for energizing said apparatus, an output detector terminal, a first resistor and a first capacitor connected in series between said first input terminal and said detector terminal, said first capacitor being variable, a second resistor and a second capacitor connected in series between said second input terminal and said detector terminal, a first test terminal connected to the junction of said second capacitor and said second resistor, a second test terminal connected to said common chassis terminal, a parallel resonant circuit connected between said test terminals with means provided for tuning the circuit to resonate at a plurality of frequencies including the frequency of said A-C voltages, and null detector means connected between said output detector terminal and said common chassis terminal.

References Cited
UNITED STATES PATENTS

| | | | |
|---|---|---|---|
| 2,371,395 | 3/1945 | Keeling | 324—61 |
| 2,607,827 | 8/1952 | Mennie | 324—57 |
| 2,650,347 | 8/1953 | Gaffney | 324—58.5 XR |

RUDOLPH V. ROLINEC, *Primary Examiner.*

WALTER L. CARLSON, *Examiner.*

C. A. S. HAMRICK, W. H. BUCKLER,
*Assistant Examiners.*

UNITED STATES PATENT OFFICE
CERTIFICATE OF CORRECTION

Patent No. 3,360,720 December 26, 1967

John H. Mennie

It is hereby certified that error appears in the above numbered patent requiring correction and that the said Letters Patent should read as corrected below.

Column 2, lines 52 and 53, strike out, second occurrence:

$$+ \frac{I_2}{J\omega C_2}$$

Signed and sealed this 21st day of January 1969.

(SEAL)
Attest:

Edward M. Fletcher, Jr.
Attesting Officer

EDWARD J. BRENNER
Commissioner of Patents